United States Patent Office.

WILLIAM KRAMER, OF NEW YORK, N. Y.

Letters Patent No. 102,836, dated May 10, 1870.

IMPROVEMENT IN HEALING-PLASTERS.

The Schedule referred to in these Letters Patent and making part of the same.

*To all whom it may concern:*

Be it known that I, WILLIAM KRAMER, of the city of New York, in the county and State of New York, have invented a new and useful Improvement in Healing-Plaster; and I do hereby declare that the following is a full, clear, and exact description thereof, which will enable others skilled in the art to make and use the same.

My invention has for its object to furnish an improved healing-plaster for sores, wounds, cuts, and the various purposes for which a healing-plaster is applicable; and It consists of the plaster prepared of the ingredients in the proportions and manner hereinafter more fully described and set forth.

The plaster is prepared of the ingredients in the proportions as follows: red lead, thirteen drams; herb sanicula, fifteen grains; litharge, three drams; camphor, one-half dram; Venice turpentine, three drams; olive-oil, three ounces; and saffron, fifteen grains.

In preparing this plaster, the olive-oil and red lead are put into an earthen pot, and boiled very slowly until the mass turns to a very light brown color. All the other ingredients are then put in at the same time, and the boiling is kept up very slowly until the mass becomes a dark chocolate color. During the entire process of cooking, which requires about three-quarters of an hour, the mass must be stirred with a wooden spoon or stirrer, and kept constantly in motion, to prevent the mass from burning or from sticking to the pot.

Having thus described my invention,

I claim as new and desire to secure by Letters Patent—

An improved healing-plaster, prepared of the ingredients, in the proportions and manner, substantially as herein described and set forth.

WILLIAM KRAMER.

Witnesses:
LOUIS MILLER,
CHRISTIAN KRAMER.